United States Patent

Johnson

Patent Number: 6,019,898
Date of Patent: Feb. 1, 2000

[54] WEIR ASSEMBLY WITH MOVABLE BAFFLE MEMBER

[75] Inventor: Lloyd W. Johnson, Roscoe, Ill.

[73] Assignee: Aqua-Aerobic Systems, Inc., Rockford, Ill.

[21] Appl. No.: 09/103,005

[22] Filed: Jun. 23, 1998

[51] Int. Cl.[7] .................................. C02F 9/00; E02B 7/00
[52] U.S. Cl. ...................... 210/260; 210/532.1; 405/87; 405/115
[58] Field of Search .................... 210/170, 232, 210/252, 255, 260, 532.1, 532.2; 137/101.27, 386; 405/87, 115, 80, 107; 96/239

[56] References Cited

U.S. PATENT DOCUMENTS

| | | |
|---|---|---|
| 2,994,432 | 8/1961 | Schluter . |
| 3,701,429 | 10/1972 | Schell ..................... 210/242 |
| 3,794,304 | 2/1974 | Cates et al. ............... 261/111 |
| 4,015,629 | 4/1977 | Morgan et al. ........... 137/578 |
| 4,112,689 | 9/1978 | Webb ....................... 405/63 |
| 4,167,358 | 9/1979 | Besha . |
| 4,279,540 | 7/1981 | Suga et al. ............... 405/115 |
| 4,314,774 | 2/1982 | Tsuji et al. ............... 405/115 |
| 4,352,591 | 10/1982 | Thompson ................ 405/87 |
| 4,498,810 | 2/1985 | Muramatsu et al. ..... 405/115 |
| 4,554,070 | 11/1985 | Jordan ..................... 210/109 |
| 4,571,997 | 2/1986 | Kepple et al. ............ 73/215 |
| 4,646,485 | 3/1987 | Ashworth ................ 51/438 |
| 4,661,015 | 4/1987 | Tsuji et al. ............... 405/115 |
| 4,662,783 | 5/1987 | Tsuji et al. ............... 405/115 |
| 4,728,221 | 3/1988 | Tsuji et al. ............... 405/115 |
| 4,780,024 | 10/1988 | Obermeyer et al. ..... 405/115 |
| 4,836,713 | 6/1989 | Muramatsu et al. ..... 405/115 |
| 4,846,603 | 7/1989 | Tsuji et al. ............... 405/115 |
| 4,881,854 | 11/1989 | Bowe ....................... 405/303 |
| 4,961,848 | 10/1990 | Logsdon . |
| 5,015,393 | 5/1991 | Russell et al. ........... 210/744 |
| 5,067,851 | 11/1991 | Fujisawa et al. ........ 405/115 |
| 5,092,707 | 3/1992 | Obermeyer ............... 405/92 |
| 5,127,766 | 7/1992 | Matsuoka et al. ....... 405/115 |
| 5,171,102 | 12/1992 | De Wit .................... 405/101 |
| 5,257,968 | 11/1993 | Caldwell .................. 494/53 |
| 5,318,381 | 6/1994 | Enami et al. ............. 405/115 |
| 5,388,928 | 2/1995 | Kumagai .................. 405/115 |
| 5,720,056 | 2/1998 | Aymes . |

Primary Examiner—David A. Simmons
Assistant Examiner—Fred Prince
Attorney, Agent, or Firm—Michael Best & Friedrich LLP

[57] ABSTRACT

A weir assembly is mountable in a wastewater treatment tank to control liquid flow from a first liquid receptacle into a second liquid receptacle. The weir assembly includes a weir member having an upright wall section mountable between the first liquid receptacle and the second liquid receptacle, and a baffle member including a body inflatable with a gas. The wall section has an upper edge positionable with respect to an open surface of the wastewater in the first liquid receptacle to allow wastewater flow over the upper edge. The baffle member is responsive to inflation of the inflatable body such that the baffle member is movable with respect to the weir member between a first position below the upper edge to a second position adjacent the upper edge as the inflatable body is substantially inflated. When the baffle member is disposed in the first position, at least a substantial portion of the baffle member is disposed below the surface of the wastewater in the first liquid receptacle. When the baffle member is disposed in the second position, the baffle member substantially restricts liquid flow over the upper edge. The baffle member may also be disposed at various positions between the first position and the second position.

26 Claims, 2 Drawing Sheets

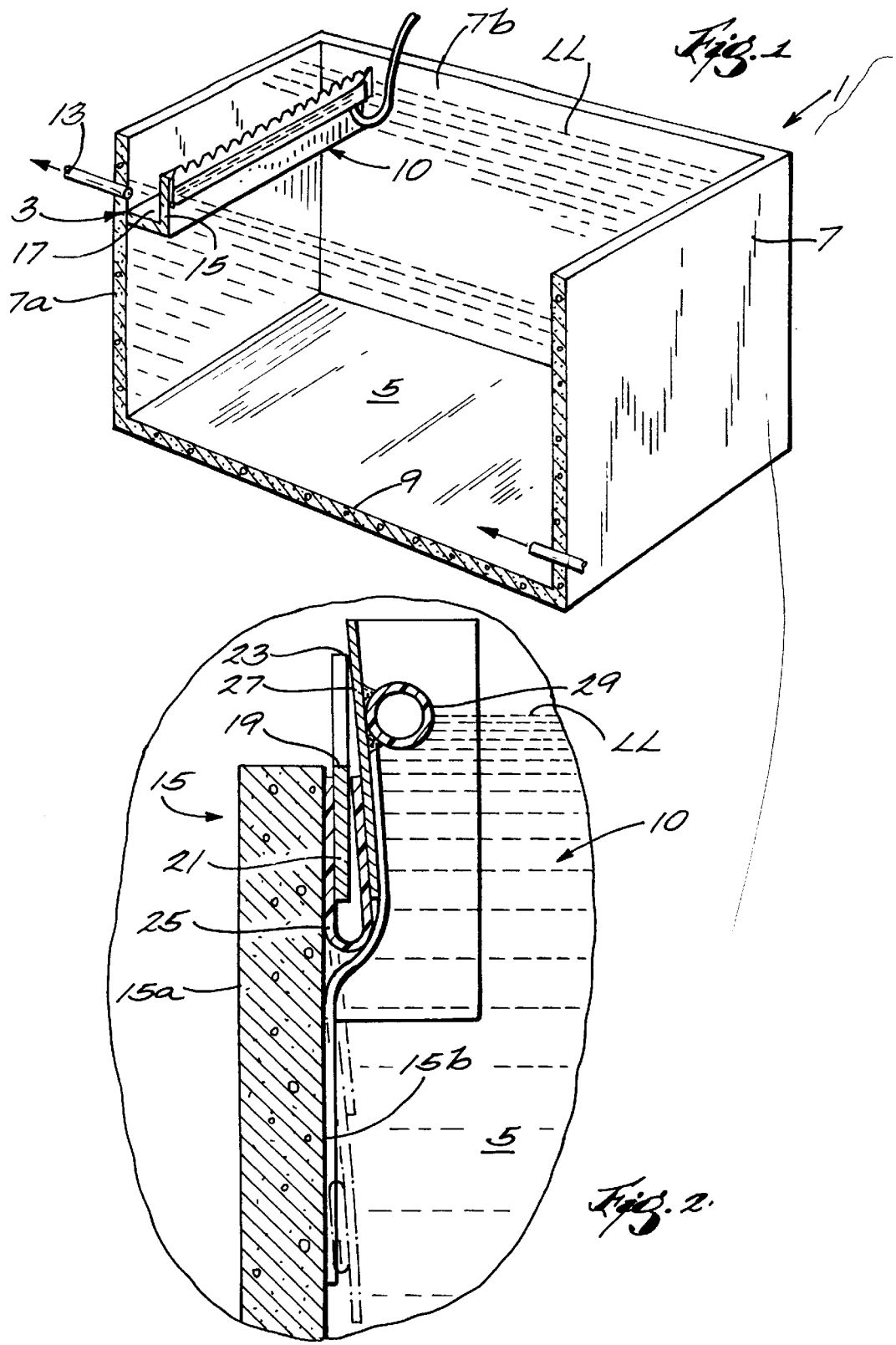

WEIR ASSEMBLY WITH MOVABLE BAFFLE MEMBER

BACKGROUND OF THE INVENTION

The present invention relates generally to an apparatus employed in the treatment of wastewater, and, more specifically, to a weir assembly for controlling the flow of liquid from a first wastewater receptacle to a second wastewater receptacle.

In a process for treating wastewater, influent wastewater is transferred into a tank or basin where it is treated in one or more treatment cycles until it is of a quality desirable for discharge. In a settle cycle, heavier solids separate from the liquid and settle to the tank bottom while lighter solids migrate to the wastewater surface. Floatable wastewater treatment devices may also be operated in the treatment tank to induce fluid motion of the influent wastewater or, otherwise, interact with the influent wastewater. For example, to promote aerobic conditions in a react cycle, a floatable surface aerator may be operated to induce an upward flow of wastewater that is discharged into the air above the wastewater surface. Further, a floatable downflow mixer may be operated to mix aerated water into the wastewater.

When relatively clean effluent is produced in the treatment tank, it is commonly removed from a top portion of the wastewater using a decanting device such as an overflow weir. The overflow weir is typically used in conjunction with an effluent receptacle that is positioned between the weir and a discharge outlet of the tank. When desired, effluent from a main compartment of the tank may be induced to flow over the weir and into the effluent receptacle from where it is then discharged through the discharge outlet. Typically, the effluent flow over the weir and the discharge of effluent from the effluent receptacle is initiated by merely opening a valve on the discharge outlet. The discharge outlet may be connected to a holding container that is positioned downstream of the discharge outlet and maintained at an elevation below the liquid level in the wastewater tank. Alternatively, a pump may be connected to the discharge outlet and operated to draw effluent from the effluent receptacle. In some installations, the effluent receptacle is a fixed channel located inside the tank and the weir is positioned adjacent a wall of the channel that separates the channel from the main compartment of the tank. In other installations, the effluent receptacle is a collection trough on a floatable decanting apparatus that floats on the surface of the wastewater and the weir is positioned adjacent an outer upright wall and rim of the collection trough.

During the various cycles in the treatment process, the discharge outlet is normally closed such that the liquid level in the effluent receptacle is maintained at a level corresponding to the liquid level in the main compartment of the wastewater tank. In this mode, liquid does not normally flow over the weir. However, operation of the aerator or mixer can cause substantial motion on the surface of the wastewater, including wave action and turbulence. Such wastewater motion can result in untreated or partially-treated wastewater and solid particles spilling over the weir and contaminating the effluent receptacle. To reduce such risk of effluent contamination, the weir and the effluent container are normally positioned in the wastewater tank at a location far from the wastewater treatment devices.

SUMMARY OF THE INVENTION

The general object of the present invention is to provide a weir apparatus for installation in a wastewater treatment tank between a first liquid container or receptacle (i.e, a main compartment of a wastewater treatment tank) and a second liquid container or receptacle (i.e., an effluent channel or floating decanter receptacle) and to control wastewater flow between the first liquid receptacle and the second liquid receptacle. It is a feature and an advantage of the present invention to provide such a weir apparatus having a means for selectively isolating the second liquid receptacle from the first liquid receptacle such that untreated or partially-treated wastewater in the first liquid receptacle is precluded from moving into the second liquid receptacle when wastewater treatment devices are operated to interact with wastewater in the first liquid receptacle.

In one aspect of the invention, the weir apparatus is an assembly of components including a weir member either mountable to or permanently formed with an existing liquid receptacle and a weir baffle apparatus or baffle member movable with respect to the weir member. The weir member includes an upright wall section disposed between the first liquid receptacle and the second liquid receptacle. The wall section has an upper edge positioned with respect to an open surface of the wastewater in the first wastewater receptacle to allow liquid flow over the upper edge. The baffle member is movable between a first position below the upper edge to a second position above the first position (e.g., adjacent the upper edge) wherein the baffle member restricts liquid flow over the upper edge. The baffle member may also be movable to a range of positions between the first position and the second position.

When the baffle member is disposed in the first position, at least a substantial portion of the baffle member may be disposed below the open surface of the wastewater in the first liquid receptacle. Further, the baffle member may be an elongated member that is pivotably mounted to the weir member and is rotatable between the first and second positions. In one embodiment of the invention, the upper edge defines at least one notch and the baffle member substantially obstructs the notch to restrict wastewater flow over the upper edge.

In another aspect of the invention, the baffle member includes a body inflatable with a gas (e.g., an elongated air hose) and an inflating device (e.g., an air supply line and/or pressure pump) disposed in fluid communication with the inflatable body. The baffle member is responsive to inflation of the inflatable body such that the baffle member is moved from the first position toward the second position as the inflatable body is substantially inflated. The baffle member may also be responsive to evacuation of gas from the inflatable body such that the baffle member is withdrawn from the second position to allow wastewater flow over the upper edge as the inflatable body is substantially evacuated of gas. To facilitate withdrawal of the baffle member from the second position, the baffle member may include a forward portion that is spaced from the weir member and which is sufficiently weighted to cause the baffle member to move from the second position toward the first position as the inflatable body is substantially evacuated of gas. In one particular embodiment, the baffle member includes an elongated flexible member that is pivotably mounted to the weir member and a forward portion which includes a baffle plate. The baffle plate is attached to the flexible member and the inflatable body is supported on the baffle plate.

It is a feature and an advantage of the invention to provide a weir assembly or weir apparatus that is particularly adapted to being used to retrofit an existing liquid receptacle (e.g., an effluent channel or floatable decanting device), or more specifically, an existing weir wall. The weir member of the invention may be integrally formed with an upright wall of the liquid receptacle or may be provided as one component of the weir assembly.

It is also a feature and an advantage of the present invention to provide a weir apparatus that is simple in design, easy to assemble, and easy to operate.

BRIEF DESCRIPTION OF THE DRAWINGS

FIG. 1 is a sectional perspective view of a wastewater treatment tank including a weir apparatus embodying the invention.

FIG. 2 is a vertical sectional view of the weir apparatus in the upright position.

DETAIL DESCRIPTION OF THE DRAWINGS

Figure 3:
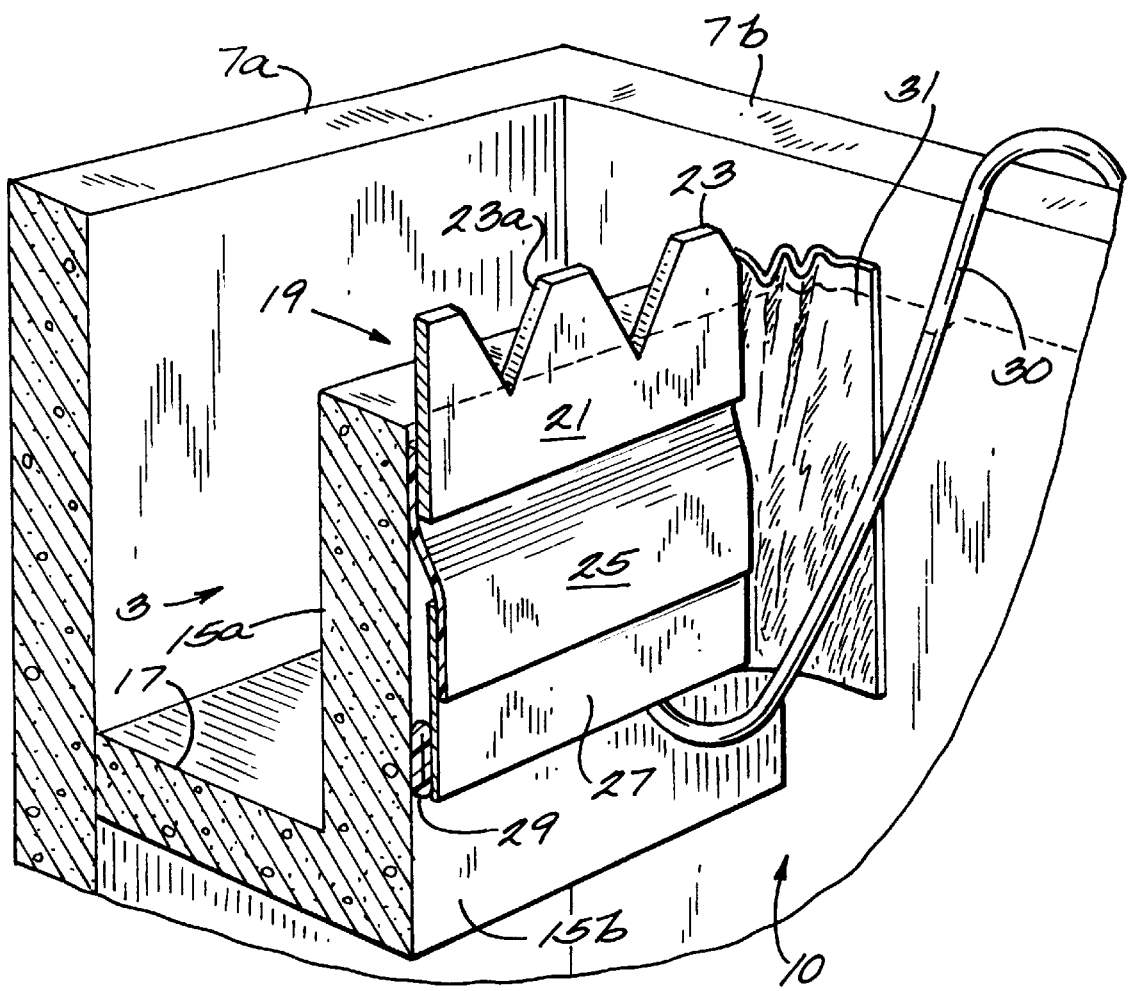
FIG. 3 is a sectional perspective view of the weir apparatus in the retracted position.

FIG. 1 depicts a wastewater treatment basin or tank 1 including a weir apparatus 10 or weir assembly 10 embodying the invention. The tank 1 contains a volume of wastewater primarily in a main compartment 5 of the tank 1 but also in an effluent channel 3. The weir assembly 10 is mounted to the effluent channel 3 and is positioned with respect to an open surface LL of the wastewater to pass relatively clean effluent from the main compartment 5 into the effluent channel 3. The tank 1 is generally rectangular and includes upright walls 7, a floor bottom 9, and an open top. The effluent channel 3 is provided with an effluent outlet 13 on a first wall 7a, for discharging effluent from the tank 1. The main compartment 5 is provided with an influent inlet 11 on an opposite wall 7c for receiving raw influent.

The effluent channel 3 extends horizontally along the first tank wall 7a and is defined partly by the wall 7a, an elongated weir wall 15 that is disposed in substantial parallel relation to the tank wall 7a, and a generally flat bottom 17 that extends between the tank wall 7a and the weir wall 15. One end of the weir wall 15 abuts a second or lateral wall 7b of the tank 1. Referring to FIG. 2, the weir wall 15 has an inside surface 15a which faces into the effluent channel 3 and an outer surface 15b which faces into the main compartment 5. The weir assembly 10 is mounted to the outer surface 15b of the weir wall 15 and extends along the length of the weir wall 15.

Referring to FIGS. 2 and 3, the weir assembly 10 includes a wall section or weir plate 19 that is mountable to the weir wall 15. The weir plate 19 has a bottom section or base 21 that is mounted to the outer surface 15b of the weir wall 15 and a top or upper edge 23 that is positioned above the weir wall 15. The upper edge 23 may be of conventional construction and design. In the embodiment depicted in FIGS. 1–3, the upper edge 23 is formed with a series of V-notches 23a (see FIG. 3). In alternative embodiments of the invention, the upper edge 23 may include notches or openings of various geometric and fluid flow designs. Further, in alternative embodiments, the weir plate 21 may be permanently or integrally formed with the weir wall 15 of the effluent channel 3. In one aspect of the invention, the weir assembly 10 is particularly adapted to being used to retrofit an existing liquid receptacle in a wastewater treatment tank 1 (e.g., the effluent channel 3), or more specifically, an existing weir wall 15 with or without an existing weir plate 21 and upper edge 23.

Referring again to FIGS. 1 and 2, the weir assembly 10 further includes a movable baffle means comprising a flexible membrane seal 25, a baffle body 27, and an inflatable hose 29. The membrane seal 25 is constructed preferably of a flexible but yet high strength material, and may be pivotably mounted, by conventional means, between the weir plate 19 and the outer surface 15b of the weir wall 15, as shown in FIG. 2, or directly to the weir plate 19. The membrane seal 25 extends downwardly from the weir plate 13 and is connected with the baffle body 27 by bolts, adhesive, or other conventional means, thereby supporting the baffle body 27.

The membrane seal 25 extends horizontally along the length of the weir plate 19. Referring to FIG. 3, the end of the membrane seal 25 is provided with a membrane extension 31 that is fastened to the side edge (now shown) of the weir plate 19 and also to the side edge (not shown) of the baffle body 27. The membrane extension 31 extends laterally from the side edges of the weir plate 21 and the baffle plate 27 and is fastened to the lateral wall 7b, thereby sealing the gap that is otherwise formed between the weir plate 21 and the lateral wall 7b. As will be explained below, the membrane extension 31 also advantageously seals the interface between the baffle body 27 and the weir plate 13 when the baffle body 27 is disposed in the upright position adjacent the weir plate 19 (as depicted in FIG. 2). At the opposite end of the effluent channel 3, the membrane seal 25 is also provided a membrane seal extension 31 that is similarly mounted to seal the gap otherwise formed between the weir plate 21 and an opposite lateral wall (not shown) of the tank. In alternative embodiments, the membrane extension 31 may be integrally formed as a continuous part of the membrane seal 25.

In the embodiment depicted in FIGS. 1–3, the baffle body 27 is an elongated baffle plate 27 having a length and width that generally corresponds with the length and width of the weir plate 19. Preferably, the baffle plate 27 is constructed from material such as steel or other material that is chemically compatible with the contents of the wastewater WW. The material for the baffle plate 27 also provides sufficient weight to the baffle plate 27 so that, when the baffle plate 27 is placed in service, it normally sinks below the wastewater surface LL to rest adjacent the weir wall 15. The weight of the baffle plate 27 acts to pivot the baffle plate 27 downwardly into the wastewater WW about the connection between the base 21 of the weir plate 19 and the membrane seal 25. The retracted positions of the baffle plate 27 and the membrane seal 25 are illustrated in FIGS. 1 and 2.

Referring to FIGS. 1 and 3, the air hose 29 is fastened to the inside surface of the baffle plate 27 and extends substantially along the bottom periphery of the baffle plate 27. The air hose 29 is preferably of a type that is reinforced with multiple plies and is selected from a material(s) that are chemically compatible with the wastewater constituents. One suitable type of air hose is a hose sold by the Goodyear Tire & Rubber Company, of Akron, Ohio, under the brand name Primeline™. The air hose 29 may be fastened to the baffle plate 27 using conventional means. The air hose 29 is in fluid communication with an inflating device that includes an air supply line 30 leading from an external pressurized air supply (not shown). In one embodiment, the air supply line is connected to a dual vacuum/pressure pump (not shown) that provides rapid deflation as well as inflation of the air hose 29.

A control means may also be provided for controlling the volume of air or other fluid delivered to the air hose 29. In this way, the air hose 29 may be inflated to various degrees of inflation and, as will become more apparent below, the baffle plate 27 may be selectively moved any one of a plurality of positions within a range of positions. The control means may be provided by a variety of fluid control devices. For example, a manual valve or automatic control valve 41 and/or a check valve (not shown) may be installed between the air hose 29 and the air supply. Alternatively, control means may be integral with a pressure pump (i.e., the dual vacuum/pressure pump).

When the air hose 29 is substantially evacuated of gas, the baffle plate 27 is suspended from the membrane seal 25 in the retracted position below the wastewater surface LL and rests adjacent the outer surface 15*b* of the weir wall 15, (see FIGS. 1 and 3). In this position, the baffle plate 27 and the membrane seal 25 do not impact effluent flow over the upper edge 23.

In alternative embodiments, the baffle body 27 may be maintained in the retracted position by adding an integral weight to the membrane seal 25, the baffle body 27, or the air hose 29. In these embodiments, the baffle plate 27 may be constructed from a relatively light material such as hard rubber or another metal. The integral weight is preferably concentrated adjacent the bottom periphery of the baffle body 27 so as to maximize the moment force which acts to rotate the baffle body 27 downwardly into the wastewater when the air hose 29 is substantially evacuated of gas. In one particular embodiment, the integral weight is a metallic rod or weighted sleeve attached to the forward perimeter of the baffle body 27, e.g., adjacent to or integral with the air hose 29.

When the air hose 29 is substantially inflated using the air supply line 30, buoyant forces inherent in the inflated air hose 29 act against the weight of the baffle plate 27 to rotate the baffle plate 27 upwardly. Substantial inflation of the air hose 29 causes the baffle plate 27 to be rotated to the upright position as depicted in FIG. 2. In the upright position, the baffle plate 27 substantially blocks the V-notches 23*a*. Further, the membrane seal extensions 31 are also rotated upwardly to effectively seal the interface between the baffle plate 27 and the outer surface 15*b* of the weir wall 15. In the upright position, the baffle plate 27 blocks the upper edge 23 and prevents wastewater, including solid particles, in the main compartment 5 from spilling over the upper edge 23. Further, the membrane extensions 31 prevent wastewater from flowing around the ends of the baffle plate 27 and in between the baffle plate 27 and the weir plate 19, and then spilling over the upper edge 23.

The baffle plate 27 may also be rotated to various positions between the upright position and the retracted position through operation of a control means (as discussed above). The control means (e.g., a valve on the air supply line 30) is operable to vary the volume of air or other fluid that is delivered to the air hose 29, thereby controlling the buoyancy of the air hose 29.

The weir assembly 10 according to the invention easily rotates downwardly from the upright position to the retracted position through operation of a gas evacuation device (not shown). When the air hose 29 is substantially evacuated, the buoyant forces acting on the baffle plate 27 is substantially reduced and are insufficient to maintain the baffle plate 27 above the wastewater surface LL. Further, the baffle plate 27 is sufficiently weighted to ensure that the baffle plate 27 is rotated completely downwardly to rest adjacent the outer surface 15*b* of the weir wall 15 (below the wastewater surface LL).

The gas evacuating device may be in the form of a manual or automatic outlet valve located on the air supply line 30. Alternatively, the air supply line 30 may be connected to a dual pressure/vacuum pump (not shown) that acts as both the air supply means and the gas evacuation device. Such a pump may be preferable when it is desirable to quickly deflate the air hose 29 and quickly return the baffle plate 27 to the retracted position. It should also be noted that the weir assembly 10 according to the invention is adaptable to use with alternative pressurized fluid sources besides air.

In an alternative embodiment, the weir assembly includes a flexible, inflatable bag in lieu of the air hose 29. The inflatable bag may be attached to, or disposed behind, the baffle plate 27. In yet another embodiment, the inflatable bag is sized and configured to function as a baffle body with respect to the upper edge 23, thereby eliminating the need for a separate baffle plate 27. When the inflatable bag is substantially inflated, it rotates and expands upwardly to substantially obstruct the upper edge 23 of the weir plate 19. Preferably, the perimeter of the inflatable bag is sufficiently weighted (i.e., with a metallic rod or an integrally-formed weighted sleeve) so that the inflatable bag is quickly brought to a retracted position below the wastewater surface when substantially evacuated of gas.

In an alternative weir assembly embodying the invention, the weir assembly 10 is installed on a floatable wastewater treatment device for skimming solids or decanting liquid near the wastewater surface LL. The floatable treatment device includes a center float housing and a collection trough formed around the float housing. The collection trough has an outer vertical wall with an upper weir edge that provides an inlet into the collection trough. The weir assembly 10 is mounted adjacent the outer surface of the outer vertical wall.

The weir assembly 10 is of a design and construction substantially similar to the weir assembly 10 depicted in FIGS. 1–3, with the primary exception being that each of the membrane seal 25, baffle body 27, and air hose 29 are adapted to circumnavigate the outer wall. Further, the baffle body 27 may be constructed of material that is more flexible than steel to facilitate upwardly rotation. Alternatively, the baffle body 27 may be formed by a plurality of curved sections which are sealingly fastened to one another.

While several embodiments of the present invention have been shown and described above, alternate embodiments will be apparent to those skilled in the art and are within the intended scope of the present invention. Therefore, the invention is to be limited only by the following claims:

What is claimed is:

1. A weir apparatus in a wastewater treatment tank used for treating a volume of wastewater, said weir apparatus for controlling wastewater flow from a first liquid receptacle into a second liquid receptacle, said weir apparatus comprising:
    a weir member including an upright wall section disposed between the first liquid receptacle and the second liquid receptacle, said wall section having an upper edge positioned with respect to an open surface of the wastewater in the first liquid receptacle to allow wastewater flow over said upper edge; and
    a baffle member movable with respect to said weir member between a first position below said upper edge and a second position above said first position, wherein said baffle member restricts wastewater flow over said upper edge when disposed in said second position.

2. The weir apparatus of claim 1, wherein said baffle member is an elongated member pivotably mounted to said weir member.

3. The weir apparatus of claim 1, wherein said upper edge defines at least one notch, and wherein said baffle member obstructs said notch to substantially restrict wastewater flow over said upper edge when said baffle member is disposed in said second position.

4. The weir apparatus of claim 1, wherein at least a substantial portion of said baffle member is disposed below the open surface of the wastewater in the first liquid receptacle when said baffle member is disposed in said first position.

5. The weir apparatus of claim 1, wherein said baffle member includes a body inflatable with a gas, said weir apparatus further comprising:
   an inflating device in fluid communication with said inflatable body; and
   wherein said baffle member is responsive to inflation of said inflatable body such that said baffle member is moved from said first position toward said second position as said inflatable body is substantially inflated.

6. The weir apparatus of claim 5, wherein said inflating device includes fluid control means for controlling the volume of gas delivered into said inflatable body so as to selectively position said baffle member at one of a plurality of positions above said first position.

7. The weir apparatus of claim 5, wherein said baffle member is responsive to evacuation of gas from said inflatable body such that said baffle member is withdrawn from said second position to allow wastewater flow over said upper edge as said inflatable body is substantially evacuated of gas.

8. The weir apparatus of claim 7, wherein said baffle member is pivotably mounted to said weir member and includes a forward portion spaced from said weir member, said forward portion being sufficiently weighted to cause said baffle member to move from said second position toward said first position as said inflatable body is substantially evacuated of gas.

9. The weir apparatus of claim 8, wherein at least a substantial portion of said baffle member is disposed below the open surface of the wastewater in the first liquid receptacle when said baffle member is disposed in said first position.

10. The weir apparatus of claim 8, wherein said baffle member includes an elongated flexible member pivotably mounted to said weir member, and wherein said forward portion includes a baffle plate attached to said flexible member, said inflatable body being supported on said baffle plate.

11. The weir apparatus of claim 1, wherein said weir member is integrally formed with an upright wall of the second liquid receptacle.

12. The weir apparatus of claim 1, further comprising:
   control means for selectively positioning said baffle member at one of a plurality of positions above said first position.

13. A weir assembly mountable in a wastewater treatment tank to control wastewater flow from a first liquid receptacle into a second liquid receptacle, said weir assembly comprising:
   a weir member including an upright wall section mountable between the first liquid receptacle and the second liquid receptacle, said wall section having an upper edge positionable with respect to an open surface of the wastewater in the first liquid receptacle to allow wastewater flow over said upper edge; and
   a baffle member including a body inflatable with a gas, said baffle member being responsive to inflation of said inflatable body when said weir assembly is mounted in the tank such that, said baffle member is movable with respect to said weir member between a first position below said upper edge to a second position above said first position as said inflatable body is substantially inflated, wherein said baffle member restricts wastewater flow over said upper edge when disposed in said second position.

14. The weir assembly of claim 13, wherein said baffle member is an elongated member pivotably mountable to said weir member.

15. The weir assembly of claim 13, wherein said upper edge defines at least one notch, and wherein said baffle member obstructs said notch to substantially restrict wastewater flow over said upper edge when said baffle member is disposed in said second position.

16. The weir assembly of claim 13, wherein at least a substantial portion of said baffle member is disposed below the open surface of the wastewater in the first liquid receptacle when said baffle member is disposed in said first position.

17. The weir assembly of claim 16, wherein said baffle member is responsive to evacuation of gas from said inflatable body such that said baffle member is withdrawn from said second position to allow wastewater flow over said upper edge as said inflatable body is substantially evacuated of gas.

18. The weir assembly of claim 16, wherein said baffle member includes a flexible member pivotably mountable to said weir member and a baffle body attached to said flexible member and spaced from said weir member, said baffle body being sufficiently weighted to move said baffle member from said second position to said first position as said inflatable body is substantially evacuated of gas.

19. The weir assembly of claim 13, wherein said weir member is integrally formed with an upright wall of the second liquid receptacle.

20. The weir assembly of claim 13, further comprising:
   means for controlling the volume of gas deliverable into said inflatable body to selectively position said baffle member at one of a plurality of positions above said first position.

21. A weir baffle assembly mountable adjacent an upright weir wall that is disposed in a wastewater treatment tank between a first liquid receptacle and a second liquid receptacle, the weir wall having an upper edge, wherein said weir baffle assembly is positionable to control wastewater flow over the upper edge from the first liquid receptacle into the second liquid receptacle, said weir baffle assembly comprising:
   a baffle member including a body inflatable with a gas, said baffle member being responsive to inflation of said inflatable body such that, when said weir baffle assembly is mounted adjacent the weir wall, said baffle member is movable with respect to the weir wall between a first position below the upper edge to a second position adjacent the upper edge, wherein said baffle member restricts liquid flow over the upper edge when disposed in said second position; and
   an inflating device in fluid communication with said inflatable body.

22. The weir baffle assembly of claim 18, wherein said baffle member is an elongated member pivotably mountable to the weir wall.

23. The weir baffle assembly of claim 21, wherein at least a substantial portion of said baffle member is disposed below an open surface of the wastewater in the first liquid receptacle when said baffle member is disposed in said first position.

24. The weir assembly of claim 23, wherein said baffle member is responsive to evacuation of said inflatable body when said weir assembly is mounted adjacent the weir wall such that said baffle member is moved from said second position toward said first position as said inflatable body is substantially evacuated of gas.

25. The weir assembly of claim 23, wherein said baffle member includes a flexible member pivotably mountable to said weir wall and a baffle body attachable to said flexible member so as to be spaced from said weir wall, said baffle body being sufficiently weighted to move said baffle member from said second position to said first position when said inflatable body is substantially evacuated of gas.

26. The weir baffle assembly of claim 23, further comprising:

fluid control means, operable with said inflating device to control the volume of gas deliverable into said inflatable body, for positioning said baffle member at one of a plurality of positions above said first position.

\* \* \* \* \*